Patented Aug. 19, 1947

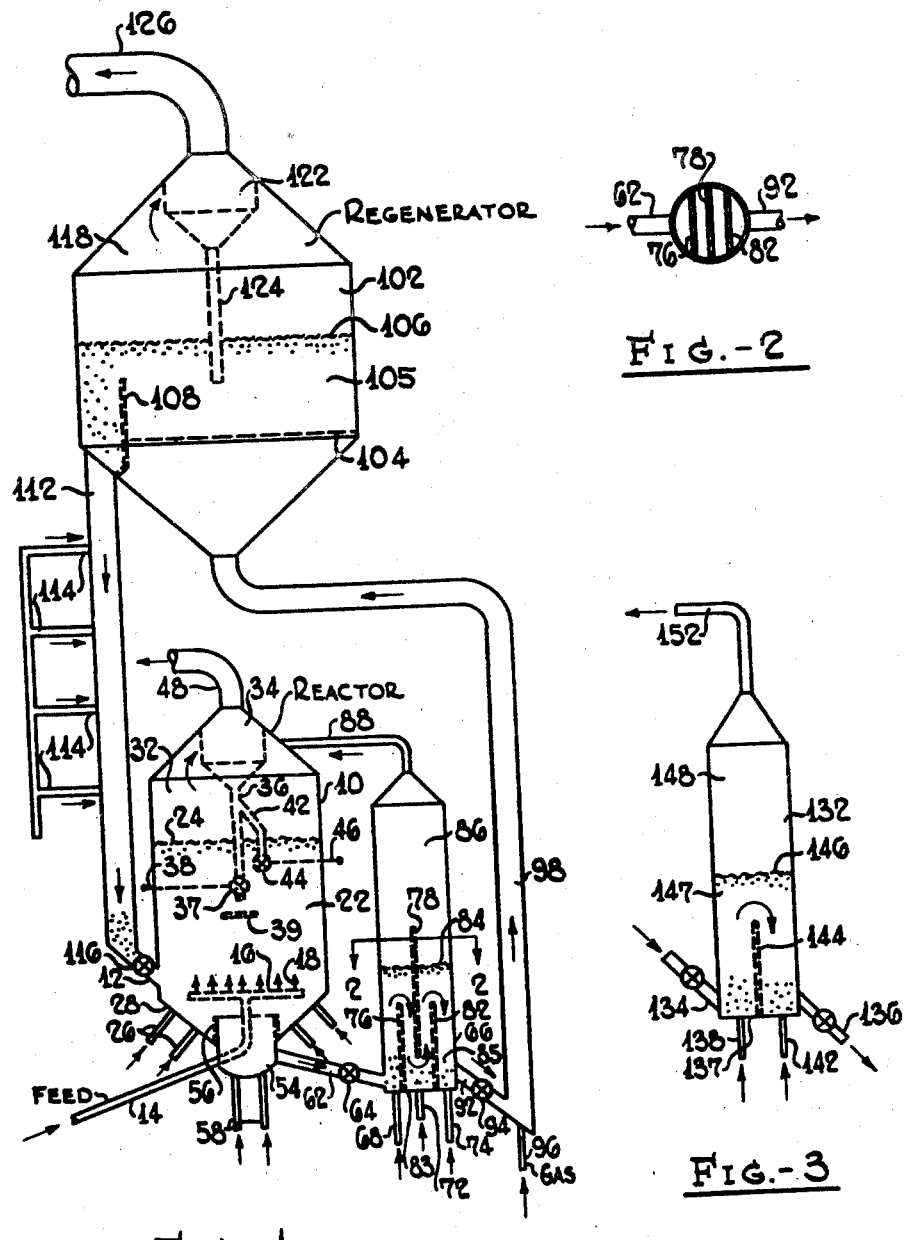

2,425,807

UNITED STATES PATENT OFFICE 2,425,807

CONTACTING SOLIDS AND GASEOUS FLUIDS

Charles E. Jahnig, Roselle, N. J., assignor to Standard Oil Development Company, a corporation of Delaware Application August 30, 1944, Serial No. 551,800

14 Claims. (Cl. 196—52)

This invention relates to contacting solid particles with gaseous fluids, and more particularly, relates to stripping contact or catalyst particles in subdivided form with a stripping gas in a separate stripping vessel wherein the solid particles are maintained in a dry fluidized dense liquid-simulating condition and the stripped solids are then withdrawn in a dry fluidized dense liquid-simulating condition.

In the catalytic conversion of hydrocarbons, the catalyst or contact particles become contaminated with coke or carbonaceous deposits and the contaminated catalyst or contact particles must be regenerated as by burning with air before being used in another conversion operation. In addition, there are hydrocarbon vapors and gases between the contaminated catalyst or contact particles and adsorbed on the adsorbent catalyst or contact particles which are preferably removed before regeneration. The amount of hydrocarbon vapors entrained between the contact particles is less when the catalyst or contact particles are removed from the reaction zone in a relatively dense condition as compared to withdrawing the reaction vaporous products and catalyst or contact particles in a relatively light suspension from the reaction zone.

If these hydrocarbon vapors and gases are not removed before regeneration, additional heat is released in the regeneration zone and also some valuable hydrocarbons are burned. The stripping action reduces the amount of combustible material associated with the catalyst or contact particles which must be removed in the regeneration zone.

Incomplete stripping has been obtained in the stripping of spent or contaminated catalyst or contact particles from catalytic conversion units of the type where the spent or contaminated catalyst particles are withdrawn in a relatively dense dry fluidized liquid-simulating condition from the bottom portion of the reaction zone.

According to my invention, better stripping is obtained with the bottom draw-off type of unit by withdrawing spent or contaminated catalyst or contact particles in a relatively dense dry fluidized liquid-simulating condition from the bottom portion of the reaction zone and introducing the withdrawn mixture into a separate stripping vessel or zone wherein the mixture is stripped with a stripping gas, and the hydrocarbon constituents removed by the stripping action are passed overhead to the upper portion of the reaction zone or other suitable place for the recovery of the hydrocarbon constituents.

In the drawing,

Fig. 1 represents one form of apparatus which may be used for carrying out my invention;

Fig. 2 represents a horizontal transverse cross-section taken substantially on line 2—2 of Fig. 1; and Fig. 3 represents another form of separate stripping vessel which may be used instead of the separate stripping vessel shown in Fig. 1.

Referring now to the drawing, the reference character 10 designates a reaction vessel into which hot regenerated catalyst is introduced through line 12 leading into the bottom portion of the reaction vessel 10. Feed stock is introduced into the bottom portion of the vessel 10 through line 14. The feed may comprise liquid hydrocarbons, hydrocarbon vapors or a mixture of liquid and vaporous hydrocarbons. The hydrocarbon feed stock may be any suitable stock, such as crude hydrocarbon oil, reduced crude, gas oils, naphthas, etc.

When the hydrocarbons are used in liquid form, a sufficient amount of hot regenerated catalyst or contact particles is introduced into the reaction vessel 10 to vaporize the hydrocarbon feed stock and to raise it to conversion temperature. Preferably the hydrocarbon feed stock is passed from line 14 to distributing line 16 arranged in the bottom portion of the reaction vessel 10. The line 16 is provided with distributing nozzles or lines 18 for introducing the hydrocarbon feed stock at a plurality of points in the bottom portion of the reaction zone 10. The velocity of the hydrocarbon vapors or gases passing upwardly through the reaction zone 10 is selected to maintain the catalyst or contact particles in a relatively dense dry fluidized liquid-simulating condition or mixture as shown at 22 with a level at 24.

When the hydrocarbon feed is introduced through lines 16 and 18, fluidizing gas, such as steam or other suitable inert gas, is introduced into the bottom portion of the reaction vessel 10 through lines 26 to maintain the particles in a fluidized condition in the funnel-shaped bottom 28 of the reaction vessel 10. If desired, additional hydrocarbon feed may be introduced through lines 26 instead of the fluidizing gas, or the feed line 14 may be eliminated and all of the hydrocarbon feed introduced through lines 26.

The space 32 in the reaction vessel 10 above the level 24 contains vaporous reaction products or gaseous fluid containing only a small amount of entrained catalyst or contact particles and is referred to as a dilute phase. The gases or vapors from the dilute phase 32 pass through a separating means 34 arranged in the upper part of the reaction vessel 10. The separating means 34 is shown as a cyclone separator but other forms of separating means may be used as, for example, a Multiclone separator.

The separating means 34 functions to remove a large part of the entrained catalyst or contact particles from the gases or vapors passing from the dilute phase 32 and the separated catalyst or contact particles are collected in the separating means and returned to the dense bed 22 below the level 24 by return or dip pipe 36. Dip leg 36 has a valve 37 and actuating means 38 extending outside the reaction vessel 10 whereby the valve 37 may be opened or closed. Preferably a plate 39 is arranged a short distance below the bottom of the dip pipe 36 to prevent vapors from passing upwardly through the dip pipe 36.

In the drawing I have shown a shorter dip pipe 42 branching from the dip pipe 36 above the level 24. The shorter dip leg 42 has a valve 44 and a controlling or actuating means 46 extending outside of the reaction vessel 10 whereby the valve 44 may be operated from the outside of the reaction vessel. When the level of fluidized solids 24 is being maintained at a relatively high level, the shorter dip pipe 42 may be used for returning solids recovered in separator 34. In this case valve 37 is closed and valve 44 is open. This arrangement is desirable in certain cases since the recovered catalyst is returned to a point of lower pressure than that existing near the bottom of the vessel 10. The vertical height of the dip legs is selected to provide the pressure necessary for returning the solids from separator 34.

When operating with a relatively low level of fluidized solids 24 in vessel 10, valve 44 is closed and valve 37 opened so that solids from separator 34 are returned below the level 24.

While I have shown the level 24 at one position in the drawing, it is to be understood that the level may be changed, if desired, by controlling the amount of catalyst or contact particles withdrawn from the bottom of the reaction vessel 10.

The vaporous or gaseous products leave the separating means 34 and the top of the reaction vessel 10 through line 48, and pass to any suitable equipment for separating desired constituents. For example, in the catalytic cracking of hydrocarbons, the vaporous reaction products contain gasoline and higher boiling hydrocarbons and the vaporous reaction products are preferably passed to a fractionating tower for separating gasoline from the remaining hydrocarbons.

The bottom of the reaction vessel 10 is provided with a pot 54 having an upstanding collar 56 which extends above the funnel-shaped bottom 28. Fluidizing lines 58 are provided for introducing fluidizing gas into the bottom of the pot. The fluidizing gas is added to maintain the contaminated or spent catalyst or contact particles in a fluidized condition, and a sufficient amount of the gas may be added to effect some stripping of entrained or adsorbed hydrocarbon vapors and gases. To improve stripping, horizontal or vertical baffles may be used in pot 54.

During the conversion of hydrocarbons, coke or carbonaceous material is deposited on the catalyst particles and it is necessary to remove the coke or carbonaceous material in a regeneration step preferably by burning with air or other regenerating gas containing free oxygen. As above pointed out, the pot 54 is provided for withdrawing the spent or contaminated catalyst particles from the bottom of the reaction zone or vessel 10 in a dense fluidized liquid-simulating condition. When the contaminated or spent catalyst or contact particles are withdrawn in this dense condition, they carry along with them hydrocarbon vapors and gases as entrained material and also as adsorbed material.

The spent or contaminated catalyst or contact particles are withdrawn from the lower portion of the pot 54 through inclined draw-off line 62 provided with a control valve 64. If desired, fluidizing gas may be introduced into the line 62 for maintaining the particles in a fluidized and free-flowing condition as they pass through the line 62. The line 62 is shown in the preferred form as an inclined tubular member but if desired, the line 62 may take a horizontal position.

The withdrawn contaminated particles are introduced into the bottom portion of a separate stripping vessel 66 provided with stripping gas inlet lines 68, 72 and 74 leading to different sections of the stripping vessel 66. The stripping vessel 66 is subdivided into a plurality of stripping sections by vertical baffles or partitions 76, 73 and 82. These baffles or partitions extend across the width of the stripping vessel 66 which is shown in cylinder form. In Fig. 2 it will be seen that the partitions or baffles extend entirely across the width of the vessel 66.

The two outside baffles or partitions 76 and 82 extend upwardly from the bottom 83 of the stripping vessel 66 to a height below the level 84 of the dense fluidized liquid-simulating mixture undergoing stripping. The central baffle or partition 78 extends from above the level 84 downwardly between the outer baffles or partitions 76 and 82 with the lower portion of the central baffle 78 being arranged some distance above the bottom 83 of the vessel 66. From the above it will be seen that the dense fluidized mixture undergoing stripping follows a path as shown by arrows in the stripping vessel 66.

The velocity of the stripping gas introduced through lines 68, 72 and 74 is selected to maintain a body 85 of a dense dry fluidized liquid-simulating mixture of the catalyst or contact particles in the stripping vessel or zone 66. The dense mixture has a level indicated at 84 with a dilute phase 86 thereabove. The stripipng gas together with vaporous or gaseous material stripped from the catalyst or contact particles passes overhead through line 88 and is preferably introduced into the upper portion of the reaction vessel 10 into the dilute phase 32 so that any entrained particles will be separated in passing through the separating means 34 in the reaction vessel 10. The stripping gas may be steam or other gas, and may be introduced hot if desired.

The temperature during catalytic cracking of hydrocarbons may vary between about 800° F. and 1100° F. but different temperatures may be used for other catalytic conversions of hydrocarbons or other reactions.

By providing the baffles in the separate stripping vessel 66, better stripping is obtained as each of the sections acts as a separate stripping section, and in addition, the catalyst or contact particles are maintained in a dry sense fluidized condition and in this way the necessary separation equipment is less than required where the catalyst or contact particles are carried in a dilute gaseous suspension.

The stripped catalyst or contact particles are withdrawn from the stripping vessel 66 in a relatively dense dry fluidized liquid-simulating condition through line 92. As shown in the drawing, the line 92 communicates with the bottom portion of the stripping section on the right-hand section formed by the partition or baffle 82 and the adjacent wall of the stripping vessel 66. The withdrawal line 92 is provided with a control valve 94 for controlling the amount of stripped particles withdrawn from the stripping vessel 66.

As shown in the drawing, the line 92 is preferably inclined to facilitate flowing of the fluidized particles through line 92 but a horizontal line may be used if desired. By using horizontal lines here and at 62, the overall height of the unit is reduced. If desired, fluidizing or aerating gas may be introduced into line 92 to maintain the particles in fluidized condition. The stripped contaminated or spent catalyst or contact particles are then mixed with a regenerating gas, such as air, introduced into line 92 below valve 94 through line 96 to form a less dense mixture of catalyst particles and gaseous regenerating medium, and this less dense mixture is passed through line 98 into the bottom portion of a regeneration vessel or zone 102 provided with a distribution plate 104.

The distribution plate 104 acts to evenly distribute the particles and the gas across the area of the regeneration vessel 102. The mixture of spent particles and regenerating gas is introduced below the distribution plate 104. The velocity of the regenerating gas is selected to maintain the catalyst or contact particles undergoing regeneration as a dense dry fluidized liquid-simulating mixture 105 having a level at 106.

Hot regenerated catalyst is withdrawn from the bed or mixture 105 through trough 108 arranged at one side of the regeneration vessel 102. From the trough 108 the hot regenerated catalyst is introduced into a standpipe 112. The hot regenerated catalyst particles are maintained in a fluidized condition in the standpipe by the introduction of fluidizing gas introduced through lines 114, and the height of the standpipe is such that the fluidized particles in the standpipe create or generate a hydrostatic pressure at the base of the standpipe which is sufficient to pass the particles through the rest of the system. The standpipe 112 is provided with a control valve 116 at its lower end for controlling the amount of catalyst or contact particles introduced into line 12 and then into reaction vessel 10.

Returning now to the regeneration vessel 102, the regeneration gases in the upper part of the regeneration vessel 102, as at 118, contain only small amounts of entrained particles and this condition is referred to as a dilute phase. The regeneration gases with entrained catalyst or contact particles pass to the separating means 122 arranged in the upper part of the regeneration vessel 102. The separating means is shown as a cyclone separator in the drawing but other forms of separating means may be used such as a Multiclone separator.

The separated particles are collected in the separating means 122 and returned to the dense bed 105 below the level 106 through dip leg or pipe 124. The vertical height of this dip leg is selected to provide sufficient static head for returning the material recovered in separator 122 to the desired point. The hot regeneration gases leave the top of the regeneration vessel 102 through line 126. These hot regeneration gases contain some entrained particles and also contain heat, and if desired, the heat may be recovered in any suitable way as by a waste heat boiler and the cooled gases may then be passed through an electrostatic precipitator to recover an additional amount of catalyst or contact particles. Instead of using a waste heat boiler and an electrostatic precipitator, the hot regeneration gases may be scrubbed with water, oil, or other liquid to recover the entrained catalyst or contact particles.

In Fig. 3 I have shown another form of stripping vessel 132 which may be substituted for the stripping vessel 66 shown in Fig. 1. Stripping vessel 132 is provided with an inclined inlet pipe 134 which corresponds to line 62 in Fig. 1 and an outlet line 136 which corresponds to line 92 in Fig. 1. Stripping gas is introduced through the bottom 137 of the stripping vessel 132 through lines 138 and 142 arranged on opposite sides of a partition or baffle 144 arranged in the stripping vessel 132.

The baffle or partition 144 extends upwardly from the bottom 137 to a level or height below the level 146 of the dense catalyst mixture 147 undergoing stripping in the stripping vessel 132. A dilute phase 148 exists above the level 146 of the dense particle mixture undergoing stripping in the lower portion of the stripping vessel 132. Stripping gas together with constituents stripped out of the spent or contaminated particles passes overhead through line 152 and may be separately recovered or may be returned to the upper portion of the reaction vessel as shown in Fig. 1 in connection with line 88. The arrow in Fig. 3 shows the path of the catalyst particles or contact particles undergoing stripping.

During regeneration, the temperature is preferably maintained between about 950° F. and 1200° F. For the catalytic cracking of hydrocarbons, any suitable cracking catalyst may be used, such as acid-treated bentonites, synthetic silica alumina gels, synthetic silica magnesia gels, etc. For other reactions or contacting steps or processes suitable contacting material is used.

While the invention has been specifically described in connection with the catalytic conversion of hydrocarbons, it is to be understood that this is by way of illustration only and that my invention may be used with other processes and various changes and modifications may be made without departing from the spirit of my invention.

What is claimed is:

1. In a method of contacting solid particles and a gaseous fluid in a contacting zone wherein the particles are maintained as a dry dense liquid-simulating mixture having a level with a dilute phase thereabove, the steps which comprise withdrawing contact particles as a dense liquid-simulating mixture from the bottom portion of said contacting zone, passing the withdrawn mixture to the bottom portion of a separate stripping zone to remove entrained gaseous fluid and wherein the particles are maintained as a dense fluidized mixture, introducing stripping gas into the bottom portion of said stripping zone, passing the dense fluidized mixture through a plurality of sections in said stripping zone so that in one section the general flow of the fluidized mixture is upwardly and in another section the general flow of the fluidizing mixture is downwardly, withdrawing dense fluidized stripped contact particles from the bottom portion of said stripping zone and withdrawing stripping gas together with stripped-out constituents from the upper portion of said stripping zone.

2. A method of contacting solid particles and gaseous fluid which comprises introducing subdivided solid particles and gaseous fluid into a contacting zone and maintaining the particles as a fluidized dense liquid-simulating mixture in said reaction zone, withdrawing dense fluidized solid particle mixture from the lower portion of said contacting zone and passing it to the bottom of a separate stripping zone, introducing stripping gas into the lower portion of said stripping zone at a velocity selected to maintain the particles in a dense fluidized liquid-simulating condition during stripping, removing stripped particles from the bottom portion of said stripping zone in a dense fluidized condition and removing stripping gas and stripped-out constituents from the upper portion of said stripping zone.

3. A method according to claim 2 wherein the gaseous fluid contains only a small amount of entrained catalyst in the upper portion of said contacting zone and the stripping gas from the top of said stripping zone is returned to the upper part of said contacting zone above the dense mixture.

4. In a method of contacting solid subdivided particles and a gaseous fluid in a contacting zone wherein the particles are maintained as a dry dense liquid-simulating mixture having a level with a dilute phase thereabove, the steps which comprise passing the dry dense mixture to a first stripping zone to remove entrained gaseous fluid wherein the particles are maintained as a dense fluidized mixture, introducing stripping gas into the bottom portion of said first stripping zone, then passing the dense fluidized mixture into the bottom portion of a stripping zone separate from said contacting zone, introducing a stripping gas into said second stripping zone at such a velocity to maintain the particles as a dense fluidized mixture therein, withdrawing dense fluidized stripped contact particles from the bottom portion of said second mentioned stripping zone and separately withdrawing stripping gas together with stripped-out constituents from the upper portion of said second mentioned stripping zone.

5. A method of carrying out catalytic reactions which comprises introducing subdivided catalyst and gaseous fluid reactant into a reaction zone and maintaining the catalyst as a fluidized dense liquid-simulating mixture having a level in said reaction zone with a dilute phase thereabove, withdrawing dense fluidized catalyst mixture from the lower portion of said reaction zone and passing it to a separate stripping zone, introducing stripping gas into the lower portion of said stripping zone at a velocity selected to maintain the catalyst in a dense fluidized liquid-simulating condition during stripping, removing stripped catalyst from the bottom portion of said stripping zone in a dense fluidized condition and removing stripping gas and stripped-out constituents from the upper portion of said stripping zone and returning them directly to the dilute phase in said reaction zone.

6. A method according to claim 5 wherein the reaction products as a gaseous fluid contain only a small amount of entrained catalyst in the dilute phase portion of said reaction zone and are passed through a separating means arranged in the upper portion of said reaction zone for separating entrained catalyst and returning the separated catalyst to the dense fluidized mixture in said reaction zone and the stripping gas from the top of said stripping zone is returned to the upper part of said reaction zone for passage through said separating means.

7. In a method of contacting solid particles and a gaseous fluid in a contacting zone wherein the particles are maintained as a dry dense liquid-simulating mixture having a level with a dilute phase thereabove, the improvement which comprises withdrawing contact particles as a dense liquid-simulating mixture from the bottom portion of said contacting zone, passing the withdrawn dense mixture to the bottom portion of a separate stripping zone to remove entrained gaseous fluid and wherein the particles are maintained as a dense fluidized mixture, introducing stripping gas into the bottom portion of said stripping zone, passing the dense fluidized mixture through a plurality of parallel sections in said stripping zone, withdrawing dense fluidized stripped contact particles from the bottom portion of said stripping zone and withdrawing stripping gas together with stripped-out constituents from the upper portion of said stripping zone.

8. In a method of contacting solid particles and a gaseous fluid in a contacting zone wherein the particles are maintained as a dry dense liquid-simulating mixture, the improvement which comprises passing the dry dense mixture from the bottom portion of said contacting zone to the bottom portion of a separate stripping zone to remove entrained gaseous fluid and wherein the particles are maintained as a dense fluidized mixture, introducing stripping gas into the bottom portion of said stripping zone and withdrawing dense fluidized stripped contact particles from the bottom portion of said stripping zone and withdrawing stripping gas together with stripped-out constituents from the upper portion of said stripping zone.

9. In a method of contacting solid particles and a gaseous fluid in a contacting zone wherein the particles are maintained as a dry dense liquid-simulating mixture, the steps which comprise passing the dry dense mixture to a separate stripping zone formed with a plurality of communicating parallel stripping sections wherein the particles are maintained as a dense dry fluidized mixture and wherein at least in one section the particles move generally in an upward direction, introducing stripping gas into the bottom portion of said stripping zone and withdrawing dense fluidized stripped contact particles from the bottom portion of said stripping zone and withdrawing stripping gas together with stripped-out constituents from the upper portion of said stripping zone.

10. A method of catalytically cracking hydrocarbons which comprises introducing subdivided catalyst and hydrocarbon oil into a cracking zone and maintaining the catalyst as a fluidized dense liquid-simulating mixture in said cracking zone, withdrawing dense fluidized spent catalyst mixture as a confined stream from the lower portion of said cracking zone and passing it to the bottom portion of a separate stripping zone, introducing stripping gas into the lower portion of said stripping zone at a velocity selected to maintain the catalyst in a dense fluidized liquid-simulating condition during stripping removing stripped catalyst from the bottom portion of said stripping zone in a dense fluidized condition, removing stripping gas and stripped-out hydrocarbon constituents from the upper portion of said stripping zone and passing the stripped spent catalyst to a regeneration zone.

11. An apparatus of the character described including a vessel adapted to hold a dry fluidized finely divided solid, a separate vessel adapted for use as a stripping vessel, said separate vessel being provided with at least one vertical baffle in the lower part thereof, a pipe connecting the bottom of said first mentioned vessel and said separate vessel for passing fluidized solid particles to said separate vessel on one side of said baffle, means for introducing stripping gas into the bottom portion of said separate vessel on both sides of said baffle for maintaining the particles in dense fluidized condition and for stripping the particles and means for withdrawing stripped finely divided solid from said separate vessel from the side opposite the pipe connection and from the other side of said baffle.

12. In a method of contacting solid subdivided particles and a gaseous fluid in a contacting zone wherein the particles are maintained as a dry dense liquid-simulating mixture having a level with a dilute phase thereabove, the steps which comprise passing the dry dense mixture to a first stripping zone to remove entrained gaseous fluid wherein the particles are maintained as a dense fluidized mixture, introducing stripping gas into the bottom portion of said first stripping zone, then passing the dense fluidized mixture into a stripping zone separate from said contacting zone, introducing a stripping gas into said second stripping zone, withdrawing dense fluidized stripped contact particles from the bottom portion of said second mentioned stripping zone and withdrawing stripping gas together with stripped-out constituents from the upper portion of said second mentioned stripping zone, the stripping gas from said first stripping zone passing upwardly into the dense fluidized mixture in said contacting zone and the stripping gas from said second mentioned stripping zone being passed directly to the upper part of said contacting zone above the dense fluidized mixture therein.

13. A method of carrying out catalytic reactions which comprises introducing subdivided catalyst and gaseous fluid reactant into a reaction zone and maintaining the catalyst as a fluidized dense liquid-simulating mixture having a level in said reaction zone with a dilute phase thereabove, withdrawing dense fluidized catalyst mixture from the bottom portion of said reaction zone and passing it to a separate stripping zone, introducing stripping gas into the lower portion of said stripping zone at a velocity selected to maintain the catalyst in a dense fluidized liquid-simulating condition during stripping, removing stripped catalyst from the bottom portion of said stripping zone in a dense fluidized condition, passing vaporous reaction products containing only a small amount of entrained catalyst in said dilute phase through separating means arranged in the upper portion of said reaction zone for separating entrained catalyst and returning the separated catalyst to the dense fluidized mixture in said reaction zone, removing stripping gas and stripped-out constituents from the upper portion of said stripping zone as a confined stream out of contact with said dense catalyst mixture and then passing them through said separating means in said reaction zone to recover entrained catalyst therefrom.

14. A method of carrying out catalytic reactions which comprises introducing subdivided catalyst and gaseous fluid reactant into a reaction zone and maintaining the catalyst as a fluidized dense liquid-simulating mixture having a level in said reaction zone with a dilute phase thereabove, withdrawing dense fluidized catalyst mixture from the bottom portion of said reaction zone and passing it to a separate stripping zone, introducing stripping gas into the lower portion of said stripping zone at a velocity selected to maintain the catalyst in a dense fluidized liquid-simulating condition during stripping, removing stripped catalyst from the bottom portion of said stripping zone in a dense fluidized condition, passing vaporous reaction products containing only a small amount of entrained catalyst in said dilute phase through separating means arranged in the upper portion of said reaction zone for separating entrained catalyst and returning the separated catalyst to the dense fluidized mixture in said reaction zone, removing stripping gas and stripped-out constituents from the upper portion of said stripping zone as a confined stream out of contact with said dense catalyst mixture and combining the stripping gas and stripped-out constituents with the vaporous reaction products removed from said dense catalyst mixture.

CHARLES E. JAHNIG.

REFERENCES CITED

The following references are of record in the file of this patent:

UNITED STATES PATENTS

| Number | Name | Date |
| --- | --- | --- |
| Re. 21,526 | Odell | Aug. 16, 1940 |
| 2,273,075 | Weems | Feb. 17, 1942 |
| 2,304,128 | Thomas | Dec. 8, 1942 |
| 2,361,978 | Swearingen | Nov. 7, 1944 |
| 2,367,694 | Snuggs | Jan. 23, 1945 |
| 2,379,408 | Arveson | July 3, 1945 |
| 2,378,531 | Becker | June 19, 1945 |
| 2,380,760 | Huff | July 31, 1945 |

FOREIGN PATENTS

| Number | Country | Date |
| --- | --- | --- |
| 118,399 | Australia | Apr. 27, 1944 |

Disclaimer 2,425,807.—*Charles E. Jahnig*, Roselle, N. J. CONTACTING SOLIDS AND GASEOUS FLUIDS. Patent dated Aug. 19, 1947. Disclaimer filed May 10, 1950, by the assignee, *Standard Oil Development Company*.

Hereby enters this disclaimer to claims 2 and 8 of said patent.

[*Official Gazette June 13, 1950.*]